United States Patent

Ikeda et al.

[11] Patent Number: 5,812,113
[45] Date of Patent: Sep. 22, 1998

[54] PICTURE FORMING DEVICE

[75] Inventors: Hisayoshi Ikeda, Kawasaki; Kenji Ikenaga; Shigeharu Maeda, both of Tokushima; Keiko Takeda; Nahoko Mase, both of Kawasaki, all of Japan

[73] Assignee: Fujitsu Limited, Kawasaki, Japan

[21] Appl. No.: 720,923

[22] Filed: Oct. 7, 1996

Related U.S. Application Data

[63] Continuation of Ser. No. 294,359, Aug. 23, 1994, abandoned.

[30] Foreign Application Priority Data

Feb. 28, 1994 [JP] Japan ..................................... 6-029427

[51] Int. Cl.⁶ ..................................................... G09G 5/08
[52] U.S. Cl. .......................... 345/145; 345/440; 345/441; 345/467; 345/469; 345/471
[58] Field of Search .................. 345/7, 145, 127, 345/129, 130, 143, 157, 144, 440, 441, 442, 443, 467, 469, 470, 471; 395/167, 168, 169, 170

[56] References Cited

U.S. PATENT DOCUMENTS

| | | | |
|---|---|---|---|
| 3,735,388 | 5/1973 | Naka | 345/127 |
| 4,129,860 | 12/1978 | Yonezawa | 345/130 |
| 4,354,184 | 10/1982 | Woborschil | 345/145 |
| 5,150,108 | 9/1992 | Markham | 345/143 |
| 5,196,837 | 3/1993 | Shoji | 345/145 |
| 5,280,576 | 1/1994 | Cao | 395/169 |
| 5,305,433 | 4/1994 | Ohno | 395/169 |
| 5,325,479 | 6/1994 | Kaasila | 395/169 |

FOREIGN PATENT DOCUMENTS 2144595  11/1988  Japan ..................................... 345/145

OTHER PUBLICATIONS

"New for PC: Change Windows Curssor, Use Right Mouse Button", Newsbytes News Network, Dec. 18, 1991.
"LisaDraw", 1983–1984. Apple Computer, Inc.
"MacPaint", 1983. Apple Computer, Inc.

*Primary Examiner*—Richard A. Hjerpe
*Assistant Examiner*—Kent Chang
*Attorney, Agent, or Firm*—Staas & Halsey

[57] ABSTRACT

There is provided a picture-forming device which is capable of easily drawing an arrow having a desired shape on a display screen of a display device, such as a CRT. The picture-forming device is capable of setting a basic shape of an arrow to be used in picture-forming. The basic shape of the arrow set is stored. When arrow display conditions indicative of a position, a direction, and a length of the arrow are entered via the display screen, data of the basic shape of the arrow and data of the arrow display conditions are synthesized, to display an image data thus synthesized, on the display screen.

8 Claims, 5 Drawing Sheets

PICTURE FORMING DEVICE

This application is a continuation of application No. 08/294,359, filed Aug. 23, 1994, now abandoned.

BACKGROUND OF THE INVENTION

1. Field of the Invention

The present invention relates to a picture-forming device for forming a picture on a screen of a display device, such as a CRT (cathode ray tube), and ore particularly to a picture-forming device having a function of entering an arrow.

2. Description of the Related Art

As the technology of computer graphics develops, a picture-forming device for forming pictures for use in presentation and the like easier to use is desired. Under such circumstances, excellent operability is demanded of the picture-forming device, for entering arrows as well, which are frequently used in forming pictures.

Conventionally, when an arrow is drawn on a picture-forming screen, a function of the picture-forming device for drawing an arrow is selected from a menu, and a position and a direction of an arrow to be entered are specified by operating a mouse. Alternatively, an arrow is drawn by using a combination of straight lines or a combination of a figure of a triangle and one of a rectangle to form a shape of an arrow.

However, the former method is limited in the variety of shapes of arrows which can be drawn, since there is a limited choice of shapes of an arrowhead, values of thickness or width of the shaft, and the like.

The latter method requires many steps to be carried out whenever an arrow is drawn, which makes the drawing work bothersome.

SUMMARY OF THE INVENTION

It is therefore an object of the present invention to provide a picture-forming device which enables a picture of an arrow having a desired shape to be drawn with ease.

To attain the above object, a picture-forming device for forming a picture on a display screen, comprising a basic arrow shape-setting unit for setting or changing data of a basic shape of an arrow to be used in picture-forming, a basic arrow shape-storing unit for storing the data of the basic shape of the arrow set or changed by the basic arrow shape-setting unit, arrow display condition-entering unit for entering arrow display conditions indicative of a position, a direction, and a length of the arrow, data-synthesizing unit for synthesizing the data of the basic shape of the arrow and data of the arrow display conditions entered by the arrow display condition-entering means to form image data, and display control means for displaying an image of the arrow based on the image data synthesized by the data-synthesizing unit, on the display screen is provided.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

First, an outline of a picture-forming device according to an embodiment of the present invention will be described.

Figure 1:
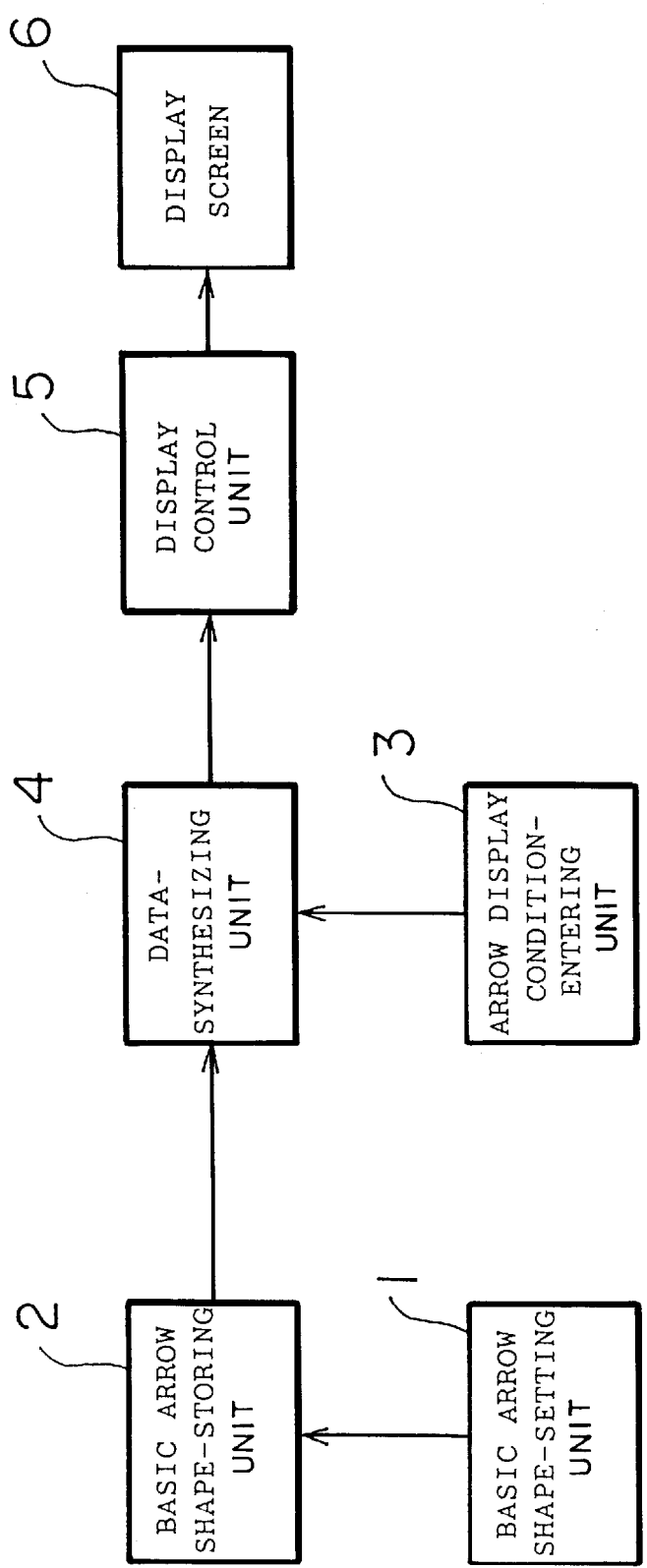
FIG. 1 is a block diagram schematically showing principles of a picture-forming device according to the present invention.

FIG. 1 schematically shows principles of construction of the picture-forming device according to the invention. As shown in FIG. 1, the picture-forming device has basic arrow shape-setting unit 1 for setting in advance data of a basic shape of an arrow to be used in picture-forming, and basic arrow shape-storing unit 2 for storing the data of the basic shape of the arrow set by the basic arrow shape-setting unit 1. Further, the device includes arrow display condition-entering unit 3 for entering arrow display conditions, i.e. a position, a direction, and a length of the arrow, and data-synthesizing unit 4 for synthesizing the data of the basic shape of the arrow read from the basic arrow shape-storing unit 2 and data of the arrow display conditions entered by the arrow display condition-entering unit 3. Display control unit 5 of the picture-forming device displays the image of the arrow on the display screen 6 based on the resulting synthesis data.

According to the picture-forming device, in the basic arrow shape-setting unit 1, data of the shape of an arrow are edited, and the resulting data are stored into the basic arrow shape-storing unit 2. When the position, direction and length of the arrow to be formed on the display screen are entered by the arrow display condition-entering unit 3, the data-synthesizing unit 4 synthesizes the data of the basic shape of the arrow stored in the basic arrow shape-storing unit 2 and the data of the arrow display conditions entered by the arrow display condition-entering unit 3, and the display control unit 5 displays the arrow having a predetermined shape and a predetermined length, on the display screen 6, at a predetermined position, in a manner oriented in a predetermined direction.

Next, the embodiment of the present invention will be described in detail.

Figure 2:
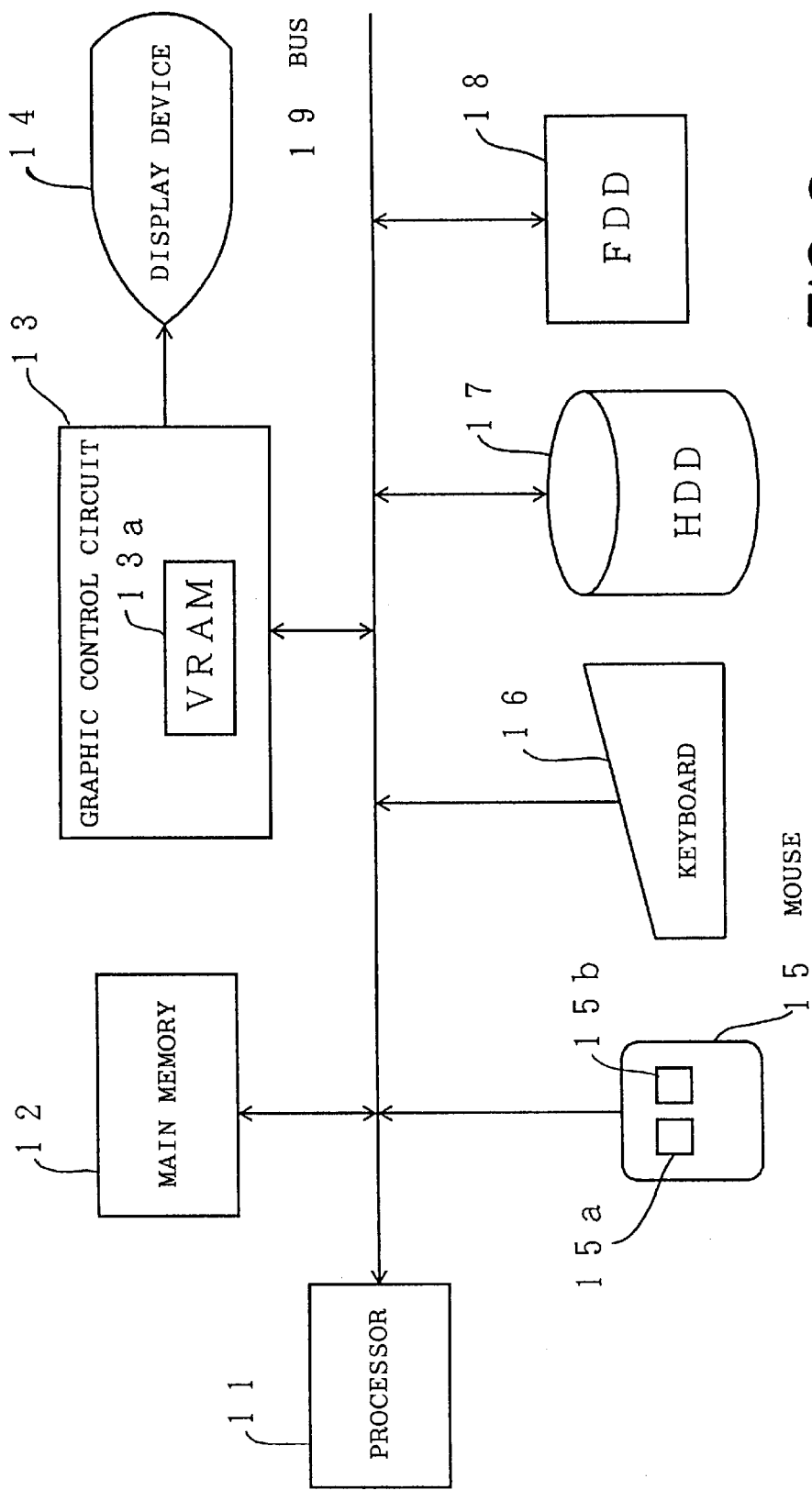
FIG. 2 is a block diagram showing the arrangement of hardware of a picture-forming device according to an embodiment of the present invention.

FIG. 2 shows the arrangement of hardware of the picture-forming device according to the present embodiment. As shown in FIG. 2, the picture-forming device has a processor 11, to which a bus 19 is connected. The bus 19 is connected to a main memory 12, and a graphic control circuit 13. The graphic control circuit 13 has a video RAM (VRAM) 13a, and an output thereof connected to a display device 14 formed e.g. by a CRT (Cathode Ray Tube). The bus 19 is also connected to a mouse 15 having two buttons 15a and 15b, a keyboard 16, a hard disk drive (HDD) 17, and a floppy disk drive (FDD) 18.

The picture-forming device is directed to preparation of an image for use in presentation, and constructed centering around the processor 11. The processor 11 reads via the bus 19 an application program for presentation, from the hard disk drive 17 into the main memory 12 when starting the picture-forming device, and executes a system program placed in the main memory 12 for forming pictures. The main memory 12 is provided with an basic arrow shape area, described hereinafter.

The graphic control circuit 13 generates image display data according to instructions from the processor 11, and stores the image display data into the VRAM 13a incorporated therein. Then, the image display data within the VRAM 13a is converted into a display signal, which is delivered to the display device 14. The display device 14 displays an image based on the display signal received from the graphic control circuit 13 on the display screen.

The mouse 15 is used for moving a mouse cursor displayed on the display screen of the display device 14 to indicate a figure displayed on the display screen for a customer during presentation, or to click buttons 15a or 15b in forming the picture, or for clicking a button 15a or 15b in forming the picture to select one from a choice of predetermined functions shown at respective locations within each menu, or to edit data of an arrow and drawing a picture of the arrow. The keyboard 16 is used in entering characters and numerical values required in operating the screen.

The hard disk drive 17 stores application programs for presentation and various data required therefor. The floppy disk drive 18 is an external storage device which is capable of driving a floppy disk to read therefrom and write therein various data related to presentation.

Next, a specific procedure of operations for displaying an arrow according to the present embodiment will be described.

Figure 3:
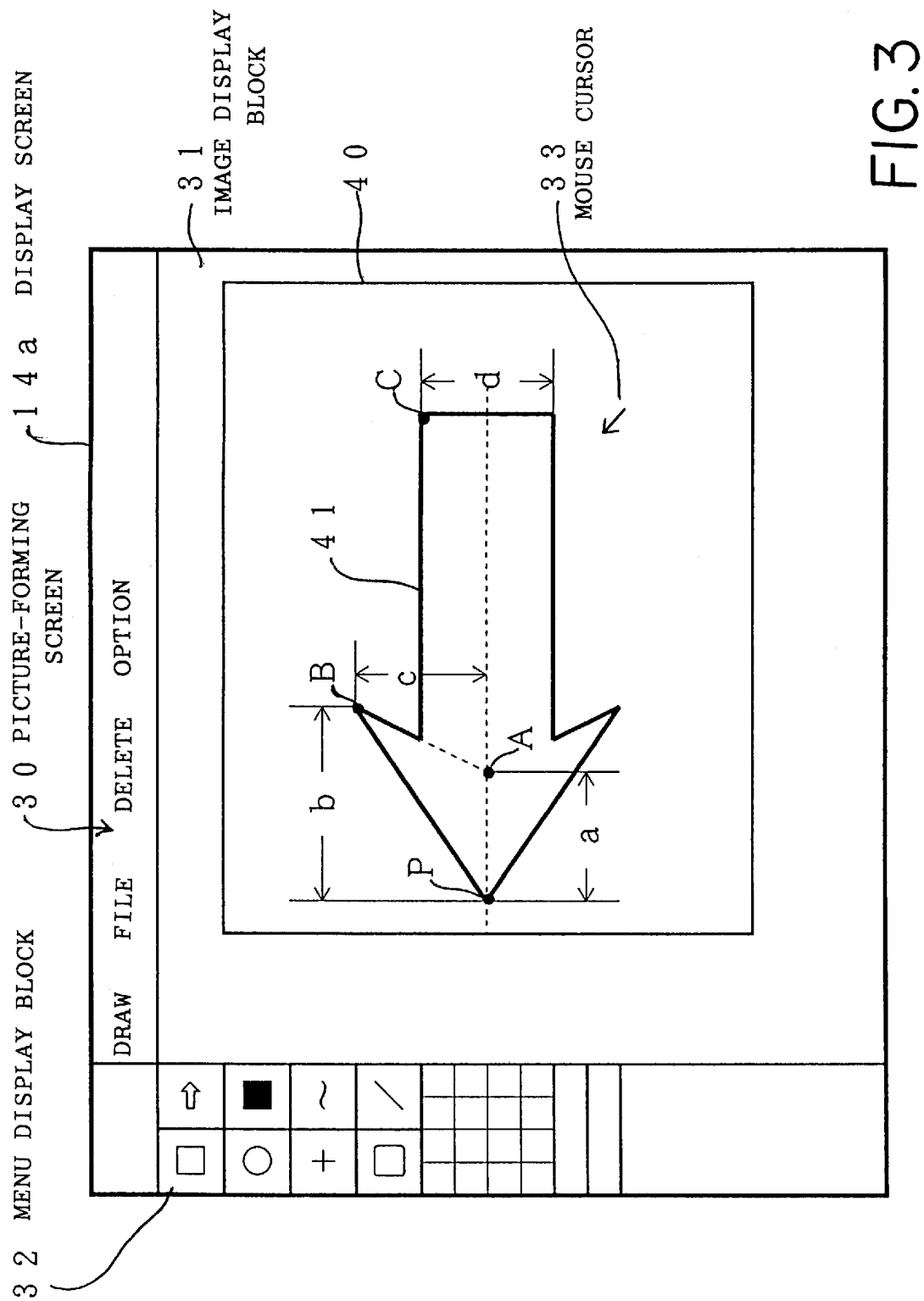
FIG. 3 is a diagram showing an example of a basic arrow shape edit screen displayed.

FIG. 3 shows an example of the basic arrow shape edit screen for editing data of a basic shape of an arrow. A display screen 14a of the display device 14 appearing in FIG. 2 displays a picture-forming screen 30. The picture-forming screen 30 includes an image display block 31 and a menu display block 32. The image display block 31 is an area for displaying images of pictures prepared by the operator. The menu display block 32 is an area for displaying various functions required in forming figures, which should be selected via a mouse cursor 33.

Data of the basic shape of an arrow are given as initial values, for example, when the picture-forming device is started, and the basic shape of the arrow is displayed within a basic arrow shape edit screen 40 presented in the form of a window as part of the image display block 31, by operating the mouse 15. The basic arrow shape edit screen 40 displays a sample 41 of the arrow, based on which the basic arrow shape is set. The sample 41 is fixed on the screen 40 in respect of a position P of the pointed end and the whole length thereof. The shape of the sample 41 is determined and presented based on setting points A, B for determining the shape of an arrowhead, and a setting point C for determining the thickness or width of the shaft of the arrow. The setting points A, B, and C can be selected for setting thereof by clicking the mouse 15 with the mouse cursor 33 being positioned on a selected one of them. The setting point thus selected can be moved to a desired position by dragging the mouse 15.

The setting point A can be moved horizontally on a center line of the arrow, whereby a setting value a is varied to change a shape of the latter part of the arrowhead. On the other hand, the setting point B can be moved vertically, whereby setting values b and c are varied to change the shape of the whole arrowhead in relation to the setting value a. Further, the setting point C can be moved vertically, whereby a setting value d is varied to change the thickness or width of the shaft of the arrow.

The setting values a, b, c, and d of the basic shape of the arrow thus set are stored into the basic arrow shape area of the main memory 12, which enables the operator to draw an arrow having the basic shape thus set at a desired position of the image display block 31.

Figure 4:
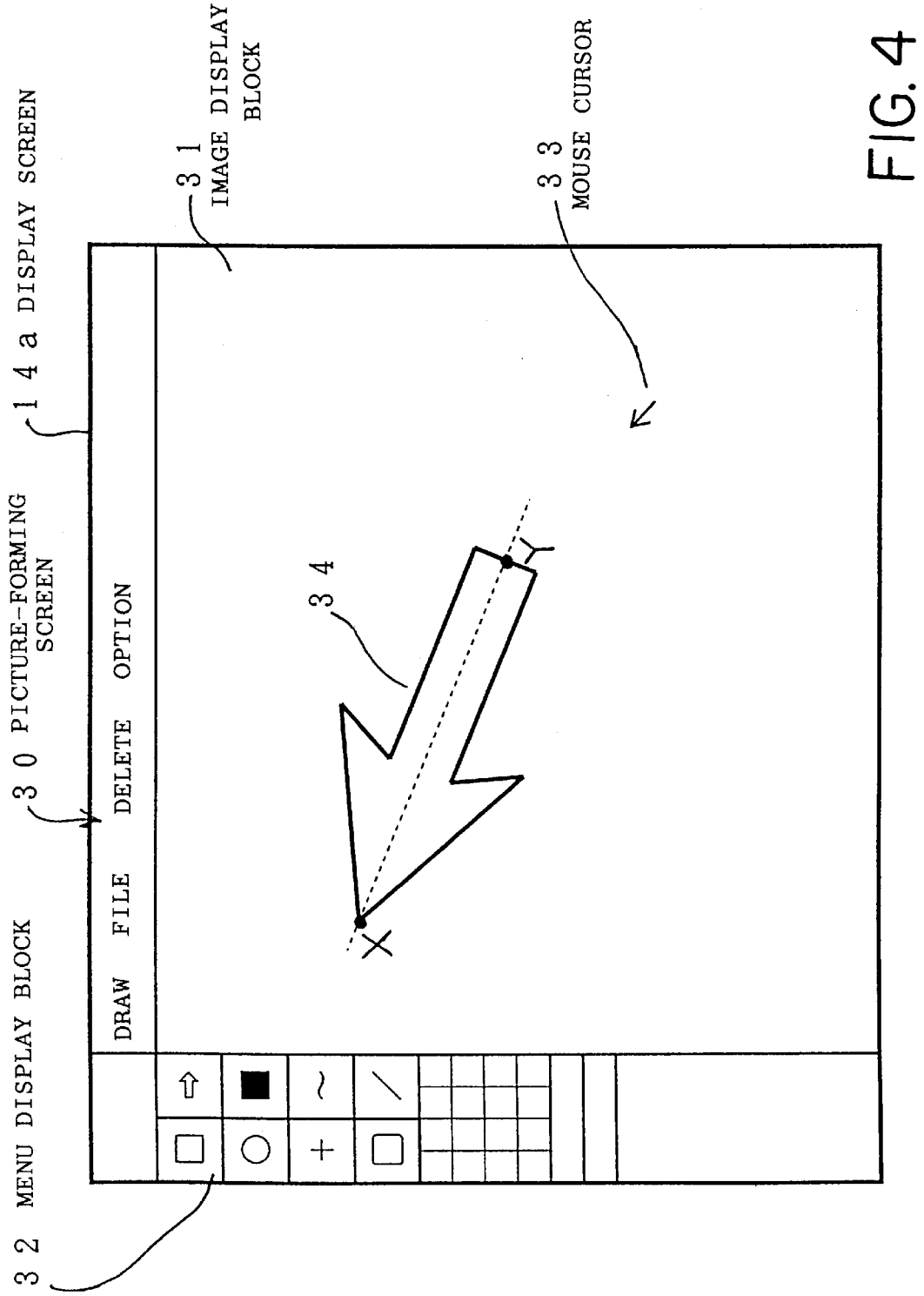
FIG. 4 is a diagram showing an example of a picture-forming screen with an arrow drawn thereon.

FIG. 4 shows an example of an arrow drawn on the picture-forming screen. The operator can enter arrow display conditions by clicking the mouse with the mouse cursor being located at points indicative a position where the arrow is desired to be displayed or the image display block 31. The arrow display conditions are specified by setting two points: a point X indicative of coordinates of a position of the pointed end of the arrow and a point Y indicative of coordinates of a position of the tail end of same, whereby it is possible to specify conditions of the arrow other than the shape thereof, i.e. a position, a direction, and a length of the arrow. It is preferred that the point Y indicative of the tail end position is first specified, and then the point X indicative of the pointed end position of same is specified. The picture-forming device reads data of the setting values a, b, c, and d of the basic arrow shape stored in the basic arrow shape area of the main memory 12, and synthesizes data of these values and data of values of the pointed end position X and the tail end position Y thus set, thereby displaying an arrow 34 on the screen.

Thus, by changing the setting values a, b, c, and d via the basic arrow shape edit screen 40, it is possible to visually and freely change the shape of the arrow, as desired. Once the basic arrow shape is set, it is possible to draw an arrow having the same shape and a desired length at a desired position in the state oriented in a desired direction.

The arrow 34 formed on the image display block 31 is specified by the data of the setting values a, b, c, and d indicative of the shape of the arrow, and the data of the arrow display conditions indicative of the pointed end position X and the tail end position Y, which are stored in the main memory 12 together with other figure element data. By the way, it is often desired to change a particular one of a plurality of arrows already displayed on the image display block 31. In such a case, the arrow desired to be changed is specified through a predetermined operation of the mouse 15, whereby the data of the shape of the arrow specified are read into the basic arrow shape area of the main memory 12, to replace the setting values a, b, c, and d by those of the shape of the arrow specified. Accordingly, it is possible to edit the data of the shape of the arrow specified, by opening the basic arrow shape edit screen 40. It goes without saying that when the basic arrow shape edit screen 40 is closed, the results of editing are automatically reflected on the arrow being drawn and specified to change its shape. Further, since data of the shape of a particular arrow is transferred, when the arrow is specified, to the basic arrow shape area of the main memory 12, so that an arrow is formed thereafter based on the data of the shape of the arrow specified. This makes it possible, when the arrow having a desired shape is already displayed, to draw arrows by the use of the data of the arrow already displayed, without opening the basic arrow shape edit screen 40.

Data of setting values a, b, c, and d in the basic arrow shape area of the main memory 12, and data of a shape and arrow display conditions of each arrow can be stored together with other picture image data into the hard disk drive 17. These data of shapes of arrows and the like can be stored in the form of bit map data in which the shapes are represented by data of colors set for each bit.

Figure 5:
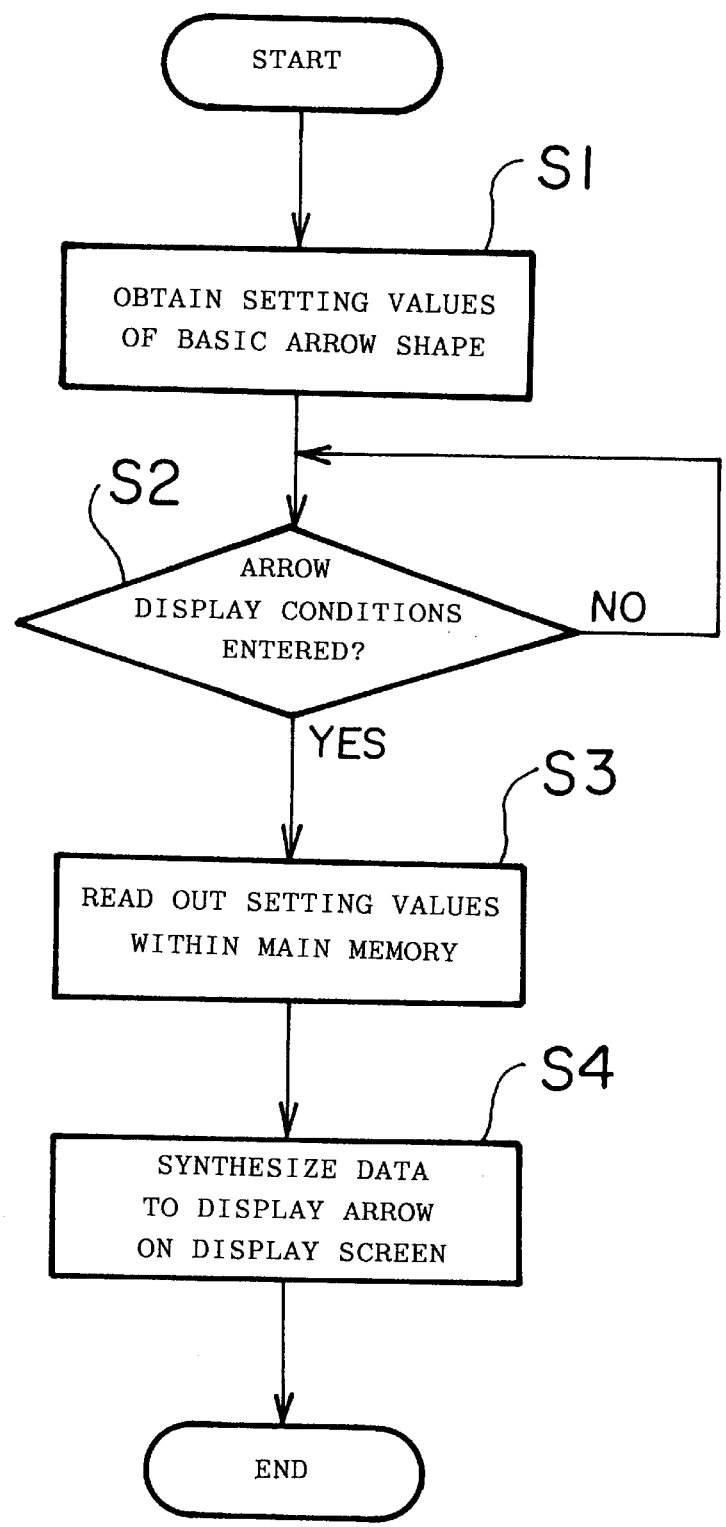
FIG. 5 is a flowchart showing a procedure of processing executed by the picture-forming device for drawing an arrow.

FIG. 5 shows a procedure of main steps of processing executed by the processor 11 to perform arrow-drawing operations described above.

[S1] Initial values of the setting values a, b, c, and d of the basic arrow shape or data of the shape of an existing arrow are obtained, and written into the basic arrow shape area of the main memory 12. Further, if edit has been carried out, edit data of a shape are obtained and written into the basic arrow shape area of the main memory 12.

[S2] It is determined whether or not the arrow display conditions of a pointed end position X and a tail end position Y have been entered. If the answer to this step is affirmative (YES), the program proceeds to a step S3, whereas if the answer is negative (NO), the program repeatedly carries out the step S2.

[S3] The setting values a, b, c, and d are read out from the basic arrow shape area of the main memory 12.

[S4] The data of the setting values a, b, c, and d read out and the data of the arrow display conditions entered are synthesized to display an image of the arrow on the screen.

As described heretofore, according to the present invention, data of the basic shape of an arrow used in picture-forming are stored such that they can be edited, and when the arrow display conditions of a position, a direction, and a length of the arrow are entered, via a display screen, data of the basic shape stored and data of the arrow display conditions are synthesized to thereby display the arrow on the screen. Therefore, once the basic shape of an arrow is set, an arrow having the same shape can be easily entered at a desired position with a desired direction and a desired length.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A picture-forming device forming a picture including arrow-shaped graphics objects on a display screen, said device comprising:

basic arrow shape-setting means for one of setting and changing data of a basic shape of an arrow selected by an operator from a display menu and then drawn as one of the graphics objects, by displaying a basic arrow with setting points, said basic arrow comprising an arrowhead and a shaft, said setting points comprising:

a first shape-setting point movable on a central line of said basic arrow and located where two backward lines extended from said arrowhead cross each other, and a second shape-setting point located where one of the two backward lines and one of two forward lines extended from said arrowhead cross each other;

arrow shape-determining means for determining the two backward lines, extended from said arrowhead, and shaft lines, based upon a relationship between first data of said first shape-setting point and second data of said second shape-setting point, each of said first data and said second data input by an operator, for determining the two forward lines extended from said arrowhead based upon a relationship between predetermined data for an arrowhead position and said first data; and display control means for displaying said arrow determined by said arrow shape-determining means on said display screen.

2. A picture-forming device as claimed in claim 1, wherein the arrow further comprises a shaft extending backward from the arrowhead and said setting points further comprise a third shape-setting point determining one of a width and a thickness of the shaft.

3. A picture-forming device as claimed in claim 2, wherein an orientation of the arrow is specified.

4. A picture-forming device as claimed in claim 1, wherein an orientation of the arrow is specified.

5. A picture-forming device as claimed in claim 1, wherein the arrow is stored in a memory and repetitively displayed on the display screen.

6. A picture-forming device as claimed in claim 2, wherein the arrow is stored in a memory and repetitively displayed on the display screen.

7. A picture-forming device as claimed in claim 3, wherein the arrow is stored in a memory and repetitively displayed on the display screen.

8. A picture-forming device forming a picture including arrow-shaped graphics objects on a display screen, comprising:

arrow shaped-setting means for setting and changing data of a shape of an arrow with setting points, said arrow comprising an arrowhead and a shaft, said setting points comprising:

a first shape-setting point movable on a central line of said arrow and located where two backward lines extend from said arrowhead cross each other, and a second shape-setting point located where one of the two backward lines and one of the forward lines extend from said arrowhead cross each other;

arrow shape-determining means for determining the two backward lines, extend from said arrowhead, and shaft lines, based upon a relationship between said first shape-setting point and said second shape-setting point, each of said first shape-setting point and said second shape-setting point input by an operator, for determining the two forward lines extended from said arrowhead based upon a relationship between a predetermined data point for an arrowhead position and said first shape-setting point; and display control means for displaying said arrow determined by said arrow shape-determining means on said display screen.

* * * * *